United States Patent [19]

Woloszyk

[11] Patent Number: 5,008,652
[45] Date of Patent: Apr. 16, 1991

[54] WATER LEAK DETECTION APPARATUS FOR USE IN SUSPENDED CEILINGS

[75] Inventor: Leonard T. Woloszyk, Greenfield, Wis.

[73] Assignee: Electro-Consultants, Inc., Greenfield, Wis.

[21] Appl. No.: 530,385

[22] Filed: May 30, 1990

[51] Int. Cl.⁵ .............................................. G08B 21/00
[52] U.S. Cl. .................................. 340/605; 340/604; 200/61.05
[58] Field of Search ............... 340/604, 605, 620, 603; 200/61.05, 61.04; 73/304 R

[56] References Cited

U.S. PATENT DOCUMENTS 4,598,273  7/1986  Bryan, Jr. et al. ............... 340/605 X
4,903,723  2/1990  Sublett ........................... 340/605 X Primary Examiner—Joseph A. Orsino
Assistant Examiner—Jeffery A. Hofsass
Attorney, Agent, or Firm—Wheeler Law Firm

[57] ABSTRACT

A device for detecting leakage of liquid through a ceiling comprising at least one liquid concentrating tray having peripheral flanges for support from ceiling panel support rails and surfaces between said flanges sloping toward narrow troughs, electric conductors for conducting electricity, sensor terminals for contacting the liquid, warning device for warning of a leak in the ceiling, and a current source for actuating the warning means when the liquid contacts the sensor terminals. The sensor terminals are connected in parallel by the electric conductors to the electric current source and the warning device in the electric circuit.

4 Claims, 2 Drawing Sheets

WATER LEAK DETECTION APPARATUS FOR USE IN SUSPENDED CEILINGS

BACKGROUND OF THE INVENTION

This invention is for detection of water leaks in ceilings and specifically the detection of water leaks in ceilings where suspended ceiling panels are used.

Suspended ceiling panels are used to finish and conceal the space near the actual ceiling of a building that is used for air conditioner or heating ducts, piping (often water filled and under pressure), electrical conduit, etc. After suspended ceiling panels are installed a very presentable finished room is achieved.

Because many businesses and offices use suspended ceiling panels, it is an objective of the invention to protect specific areas of high value within an office or building, such as computing equipment, electronic instrumentation, telecommunications equipment and valuable documents and records, etc., against leakage in both occupied and unoccupied areas.

The instant invention represents the most practical approach to sensing water leakage onto the or into conventional acoustical ceiling panels. Two major factors were considered in devising this system. First, the fact that a suspended grid system, consisting of conventional supporting grid rails to retain individual panels, is normally used to hold ceiling panels in place was considered. The use of suspended grid systems means that leakage in one area of a ceiling or panel will not readily spread to other panels; the grid acting as a barrier between panels. Instead liquid will leak through a particular panel or cause leakage along an edge of a panel to an area below the ceiling. A further initial consideration is that fact that hanging wires are usually used to support a suspended grid rail system. Accordingly, any simple overall barrier, for example a large plastic covering, is not practical due to interference with the many support wires. Second, the porosity of the panels themselves means that leakage is, at least initially, readily absorbed by the panel itself rather than forming a pool or puddle on the top side of each panel which facilitate detection. Also, the porosity of the ceiling panels allows the panels to absorb water vapor from the air. This makes the panels quite conductive over a very wide range of relative humidity.

Because a suspended grid system is normally used, it is an objective of this invention to sense liquid leakage on each individual ceiling panel or a group of strategically placed panels in a ceiling. Because of the hanging grid wires and numerous other possible mechanical interference objects, e.g. duct work, water pipes, conduit, etc. located above the suspended grid, it is an objective to have the invention maintain a low profile on the top side of the ceiling panels. A low profile allows for easy installation and removal of individual ceiling panels to which the invention is attached and allows ceiling panels to be easily converted so that the ceiling panels combined with the invention become liquid sensing panels. Because the invention may be used on many ceiling panels it is an objective to allow each sensing panel to be interconnected with another sensing panel so that the circuit of the invention can extend from panel to panel and allow each sensing panel to be easily disengaged or engaged with every other sensing panel; this ability facilitates maintenance and repair of the ceiling as well as ease of use of the invention.

It is the main objective of this invention to provide an early warning system for detecting and indicating when liquid leaks into or onto suspended acoustical ceiling panels before the liquid leaks through or along the edges of the panels to the area located below.

SUMMARY OF THE INVENTION

The invention includes novel trays to concentrate leaking liquids and an electric circuit for detecting leakage of liquid through a ceiling, preferably consisting essentially of suspended ceiling panels, comprising electric conductor means for conducting electricity, sensor terminal means for sensing the liquid leaked onto the ceiling, warning means for warning of a leak in the ceiling, and actuating means for actuating the warning means when the liquid contacts the sensor terminal means. The sensor terminal means are connected in parallel by the electric conductor means to the actuating means and the warning means in the electric circuit. The actuating means maybe a source of current flow. The novel trays for concentrating leaking liquids have peripheral flanges for support from ceiling panel support rails or suspended grids and surfaces between the flanges that slope toward narrow troughs in which liquid may be collected.

In principle the invention is activated by conductive liquid bridging a pair of sensors or terminals which are usually located in troughs of plastic sensing trays that are attached to the backsides of predetermined ceiling panels; hereafter sensing panels or trays. The prongs of each terminal are connected in parallel by a pair of plastic insulated wires. Any sensor terminals in contact with conductive liquid will create current paths in the parallel circuit. The creation of a current path reduces the total resistance across the parallel circuit.

Further, because the resistance of air is extremely high and the resistance of water is extremely low, when the liquid replaces the air normally present between the sensor terminals an extreme change in the resistance of the circuit occurs. The extreme change in resisitivity is used to signal impedance so that it can be transmitted along very long distances.

It should be noted that, in addition to using the change in resistivity of the circuit, changes in the capacitance, current flow, voltage drop, etc. all could be used as triggers to indicate that the gap between the sensor terminals has been bridged by some matter more conductive than air; most likely water.

Many electronic sensors operate on the principle of water (or rising water in the case of water level detectors) bridging a pair of sensing probes. However the applicant knows of no prior art teaching the use of such sensors in concentrating trays to detect leakage through a ceiling.

As indicated above the parallel circuit of the invention may be divided into separate sections. Each section may be attached to a predetermined ceiling panel creating sensing panels. In order to complete the circuit the wired sensing panels are interconnected, from one panel to the next, via nongender two pin connectors to make up protected zones. A zone is typically made up of eight 2-foot by 4-foot panels. The last panel in a zone is connected to a warning device to achieve the type of monitoring system that the user desires. A plurality of zones may be used to cover an entire ceiling.

Experimentation has shown that it is most effective to limit the size of each sensing zone to eight 2-foot by 4-foot sensing panels because the arrays of sensor terminals and associated wiring of each panel have a very high impedance. This means that the circuit is subject to electrical noise pick-up as well as the effects of surface leakage due to high humidity combined with dust and dirt. The above effects limit the number of panels which can be effectively interconnected before being terminated at the alarm. Testing under extreme conditions of electrical noise and relative humidity reveals that it is best to use eight 2 foot by 4-foot panels to maintain a good safety factor against nuisance activation of the warning device.

The instant invention makes use of many sensor terminals extending over a range of 50 to 100 feet and connected in parallel by a twisted insulated pair or tightly parallel pair of speaker cable. Using twisted pair or tightly parallel pair of speaker cable for 50 to 100 foot runs in conjunction with standard electronic filtering techniques on the input stage of the warning device results in a practical reasonable cost zone sensing technique.

These and other benefits of the present invention will be apparent to one skilled in the art from the following description.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
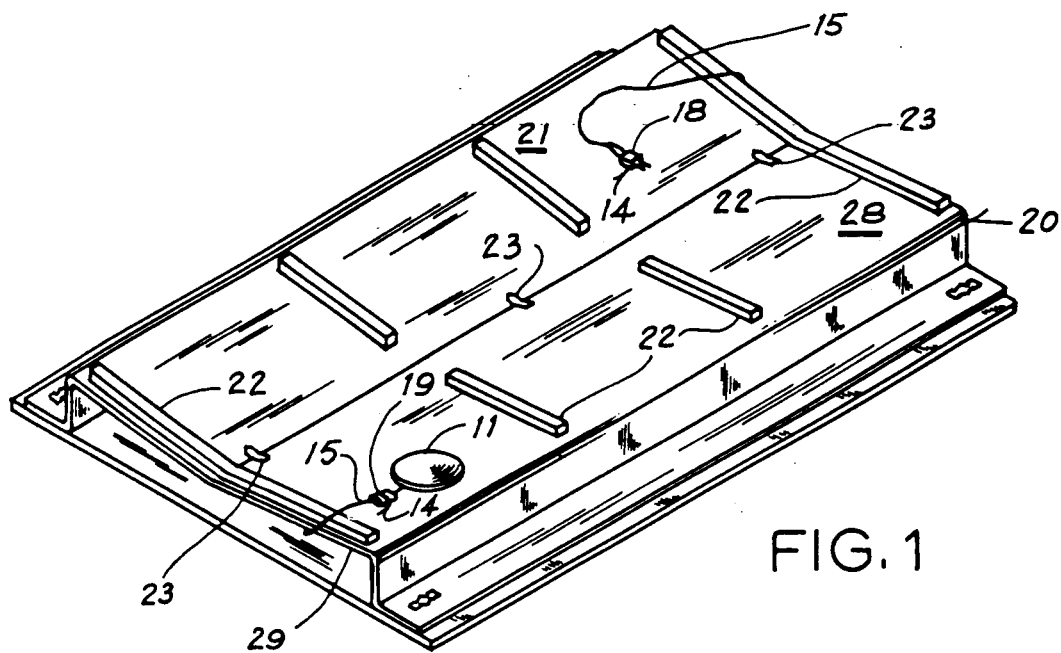
FIG. 1 is a perspective view of the invention mounted on a ceiling panel.
Figure 5:
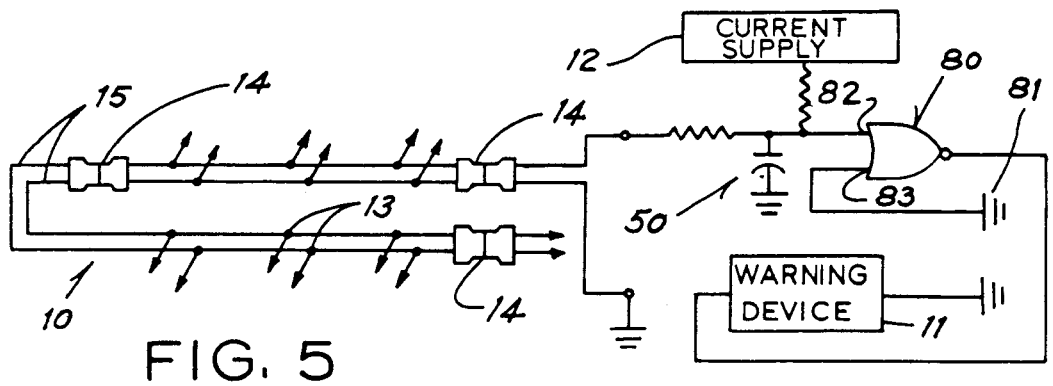
FIG. 5 is a schematic diagram of the parallel circuit of the invention.
Figure 6:
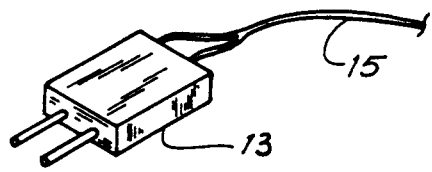
FIG. 6 is a perspective view of a sensor terminal.

The invention is preferably comprised of an open electric circuit 10 and a plurality of plastic trays 20; if coverage of only a very small area of a ceiling is desired then only a single plastic tray 20 is required. The circuit 10 is made up of a pair of plastic insulated wires 15, a warning device 11, current supply device 12 (for example a battery or conventional low voltage power supply), sensor terminals 13, non-gender panel to panel connectors 14 and a NOR gate 80. See FIG. 5. The plastic sensing tray 20 has a trough side 28 and a bottom side 29. Integral with the trough side 28 of the tray 20 is a trough 21, stiffening ribs 22, and openings 23. See FIG. 1.

Figure 2:
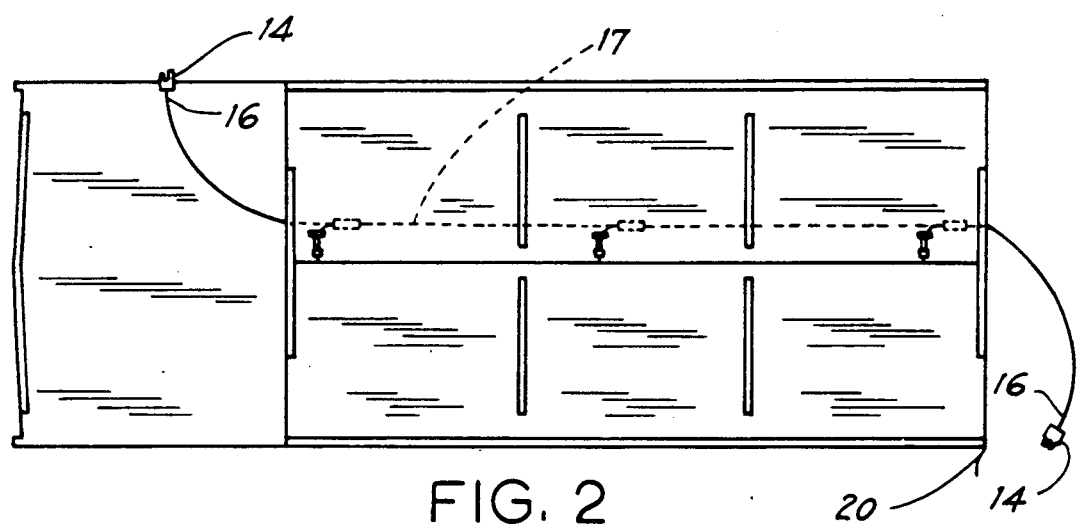
FIG. 2 is a top plan view of an intermediate panel of the invention.
Figure 7:
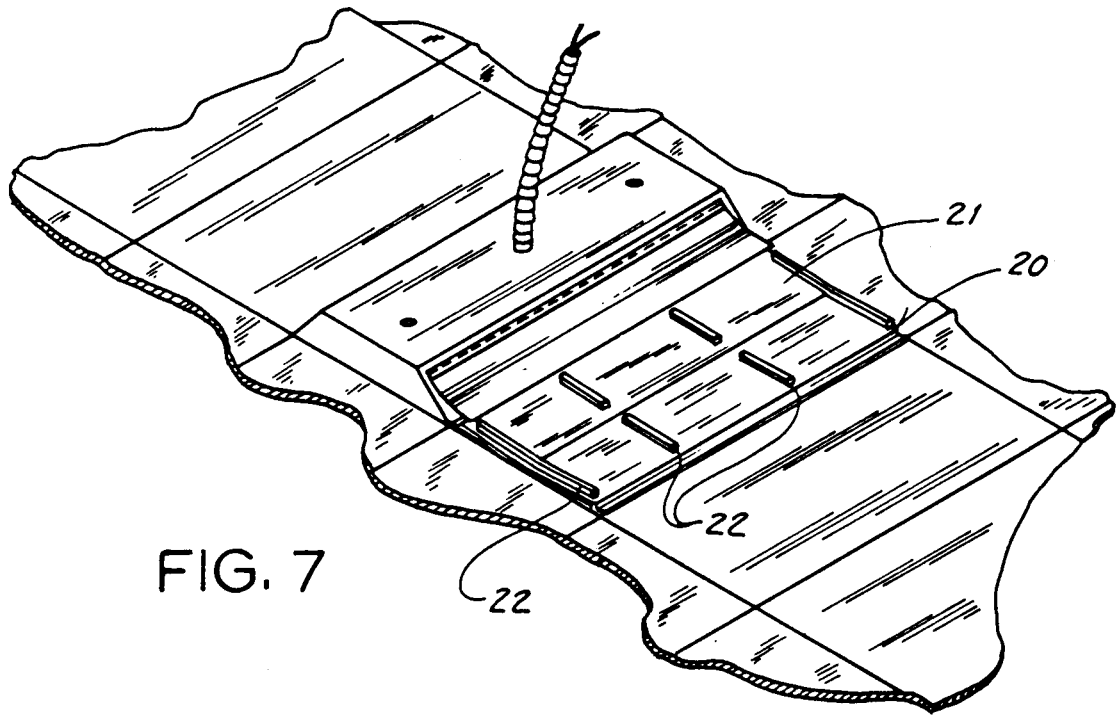
FIG. 7 is a perspective view of the invention is relationship to a lighting fixture.

The openings 23 are located at the bottom of the trough 21 of the trough side 28 of the plastic sensing tray 20. The openings 23 extend from the trough side 28 to the bottom side 29. The trough 21 directs any liquid that leaks onto the tray 20 to the openings 23. Stiffening ribs 22 are located at predetermined positions on the trough side 28 of the sensing tray 20. See FIGS. 1, 2, and 7. The ribs 22 help stiffen the trays 20 and at the same time retain any liquid leakage that may occur through the ceiling, in the trough 21. See FIGS. 1 and 2.

The circuit 10 is attached to the bottom side 29 of the tray 20.

The circuit 10 has essentially two main ends 18 and 19. The first end 18 is a non-gender panel to panel connector 14. The second end 19 is the warning device 11. The circuit 10 has intermediate sections 17. See FIG. 2. Intermediate sections 17 of the circuit 10 are designed with connectors 14 located at each end 16 of each section 17; for the purpose of extending or increasing the number of trays 20 in a given circuit 10 between the first end 18 of the circuit 10 and the second end 19 of the circuit 10. The connectors 14 allow for easy connection between various trays 20.

Figure 3:
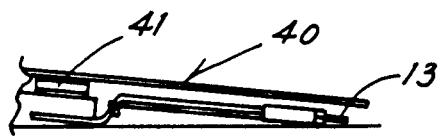
FIG. 3 is a side elevational view of a sensor terminal and optional dust cover.

The sensing terminals 13 are connected in parallel by the wires 15 to the current supply device 12, the connectors 14, the NOR gate 80, and the warning device 11. See FIGS. 1 and 5. The sensing terminals 13 extend through the openings 23 of the tray 20 from the bottom side 29 to the trough side 28. The openings 23 are sealed with an adhesive/sealant to insure water leaking into the trough 21 does not pass through to the ceiling panel below the troughed sensing tray 20. A plastic dust cover 40, as shown in FIG. 3, may also be used to protect the sensor 13 from the accumulation of dust; double sided tape 41 is preferably used to mount the cover 40 to the tray 20.

The warning device 11 is actuated by the current supply device 12 when there is a drop in resistance across the sensing terminals 13 of the circuit 10. This is because the NOR gate 80 acts as both a switch and an amplifier. Please see FIG. 5. The NOR gate is normally switched to divert the relatively high current input of the from the current supply 12 to ground 81. However by creating a cross connection to complete the circuit 10 or by increasing the number of cross-connections in the circuit 10 the resistance is, as a whole, decreased. This causes a corresponding drop in current to the NOR gate 80 from the current supply 12 which causes the NOR gate 80 to have two relatively low current inputs; at connection points 82 and 83. This causes the NOR gate 80 to switch and amplify the flow of current from ground to the warning device 11. The warning device 11 then sounds. A cross connection is created whenever liquid causes a connection between two of the parallel sensor terminals 13.

Warning device 11 may include audible or visible signals, and in very sensitive installations could include activators for corrective measures such as pumps, valves and ventilators. Further, the liquid creating the cross connection, while usually water, can be any liquid capable of either conducting electricity itself or of holding electrolytes which can conduct electricity. To insure sensing of de-ionized or distilled water, an electrolyte solution, preferably salt water, is sprayed on the trough side 28 of the tray 20 (avoiding the sensors 13) during manufacture. As the solution evaporates the electrolyte is left behind on the tray 20. This electrolyte then goes into solution when water leaks onto the tray 20 and enhance the conductivity of the water collected by the tray 20.

In order to reduce line noise in the high impedance circuit the addition of a noise filter capacitor 50 is preferred. See FIG. 5.

Figure 4:
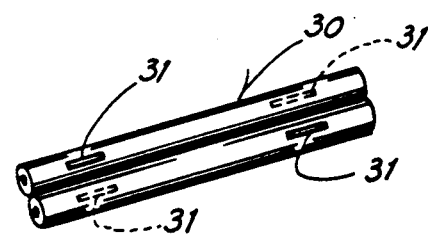
FIG. 4 is a plan view of the sensor terminals of an alternative embodiment of the invention.

Alternatively, referring to FIG. 4, instead of using sensing terminals 13, tightly twisted speaker wire 30 could be substituted in the circuit 10 with slits 31 exposing sections of the circuit to act as sensing terminals 12. The slits 31 in the wire are made in close proximity to each other. Generally, on alternating sides of the speaker wire as may be seen in FIG. 5. The slits 31 expose the speaker wire 30 so that the exposed sections of wire act in the same manner as the sensor terminals 12. Preferably, the slits 31 should be at one inch intervals along the length of the wire 30. Each slit 31 should be approximately 0.25 inches in length and 0.3125 inches in width. Please see FIG. 4.

The above described embodiments of this invention are merely descriptive of its principles and are not to be limiting. The scope of this invention instead shall be determined from the scope of the following claims, including their equivalents.

What is claimed is:

1. A device, on the top side of a suspended ceiling panel for detecting leakage of liquid on to and through a ceiling comprising:

at least one liquid concentrating tray having surfaces sloping to form a narrow trough;

electric conductor means for conducting electricity, sensor terminal; means in said troughs to be contacted by said liquid, warning means for warning of a leak in said ceiling, and current supply means in a circuit to actuate said warning means when said liquid contacts said sensor terminal means;

said sensor terminal means being connected in parallel by said electric conductor means to said current supply means and said warning means in said electric circuit.

2. The device of claim 1 in which said liquid concentrating tray has a bottom circuit side and a top trough side;

said trough having ribs, located at pre-determined intervals, for stiffening said trough and retaining said leakage in said trough.

3. The device of claim 1 in which said liquid concentrating tray has peripheral flanges for support from panel support rails and surfaces between said flanges sloping to form said narrow trough.

4. A liquid leakage detection system for detecting liquid leaked on top of a suspended ceiling panels comprising:

a plurality of generally nonconductive liquid concentrating trays attached to said ceiling panels;

an electric circuit, generally in contact with said trays, having electric conductor means for conducting electricity, sensor terminal means on said tray to be contacted by said liquid, warning means for warning when said liquid contacts said sensor terminal means, and current supply means for actuating said warning means when said sensor terminal means contacts said liquid;

said sensor terminal means connected in parallel by said electric conductor means to said current supply means and said warning means in said electric circuit.

* * * * *